United States Patent
Dujardin et al.

[11] Patent Number: 5,992,656
[45] Date of Patent: Nov. 30, 1999

[54] PLASTIC CLOSURE WITH CORRESPONDING TUBE BODY

[75] Inventors: Francois Dujardin, Hilpoltstein; Richard Fröhling, Schesslitz, both of Germany

[73] Assignee: CEBAL Verpackungen GmbH, Nürnberg, Germany

[21] Appl. No.: 08/786,271

[22] Filed: Jan. 22, 1997

[30] Foreign Application Priority Data

Jan. 23, 1996 [DE] Germany .............................. 196 02 258

[51] Int. Cl.⁶ .................................................. B65D 41/04
[52] U.S. Cl. .............................. 215/44; 215/330; 215/331
[58] Field of Search .............................. 215/43, 44, 217, 215/218, 219, 209, 221, 222, 329, 330, 331, 334; 220/288, 666, 669, 674, 675, DIG. 13; 222/96, 107

[56] References Cited

U.S. PATENT DOCUMENTS

| | | |
|---|---|---|
| 3,465,917 | 9/1969 | Saeki . |
| 3,581,926 | 6/1971 | Roder ...................................... 215/330 |
| 4,280,632 | 7/1981 | Yuhara .................................. 215/334 X |
| 4,535,906 | 8/1985 | Rowekamp ......................... 215/334 X |
| 4,591,063 | 5/1986 | Geiger .................................. 215/331 X |
| 4,662,530 | 5/1987 | Goncalves et al. ................. 215/331 X |
| 4,858,777 | 8/1989 | Morel .................................. 215/331 X |
| 5,123,556 | 6/1992 | Goldenberg .............................. 215/330 |
| 5,160,057 | 11/1992 | Fitjer .................................... 215/331 X |
| 5,687,863 | 11/1997 | Kusz .................................... 215/331 X |

FOREIGN PATENT DOCUMENTS

| | | |
|---|---|---|
| 567216 | 4/1984 | Australia . |
| 010028 | 4/1980 | European Pat. Off. ............... 215/331 |
| 2441554 | 7/1980 | France ................................... 215/334 |
| 2913883 | 10/1980 | Germany .............................. 215/330 |
| 4100894 | 7/1992 | Germany . |
| 4100757 | 8/1992 | Germany . |
| 2044736 | 10/1980 | United Kingdom ................... 215/330 |
| 9209494 | 6/1992 | WIPO . |

*Primary Examiner*—Stephen K. Cronin
*Assistant Examiner*—Nathan Newhouse
*Attorney, Agent, or Firm*—Friedrich Kueffner

[57] ABSTRACT

A plastic tube with a tubular tube body which is connected through a shoulder to a neck having an external thread and with a screw cap which can be screwed with an internal thread onto the external thread of the neck. The shoulder is injection molded onto the corresponding end of the tube body, wherein the shoulder and the externally threaded neck are constructed in one piece. The shoulder and the adjacent end of the tube body have a polygonal cross-section and the same polygonal cross-section continues over the length of the tube body. At least two side surfaces of the tube body extend from this transition point essentially plane or with a straight surface toward the end of the tube.

14 Claims, 3 Drawing Sheets

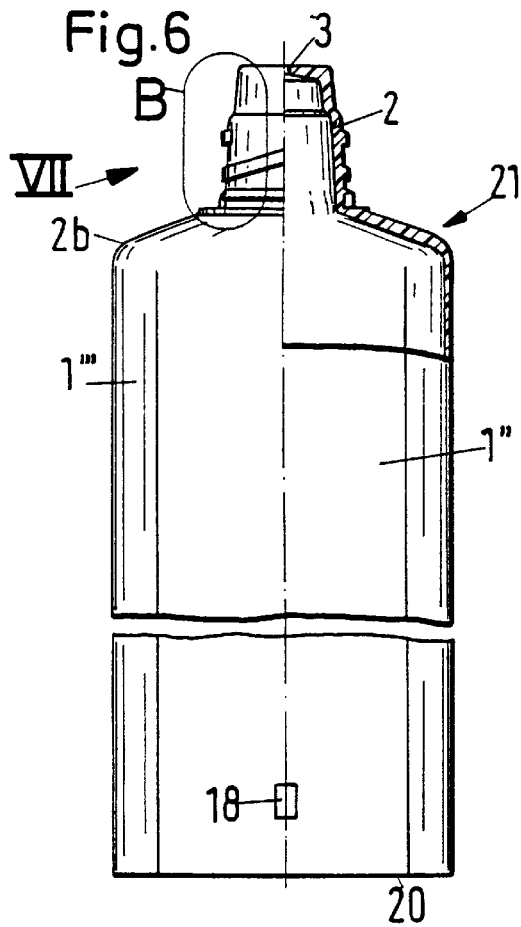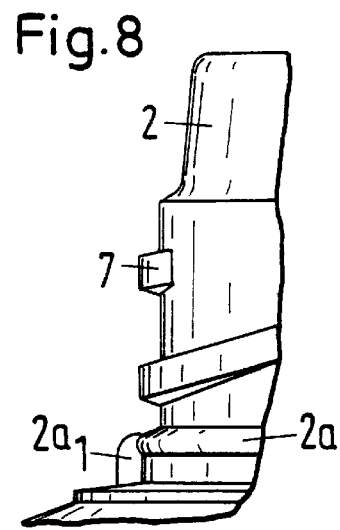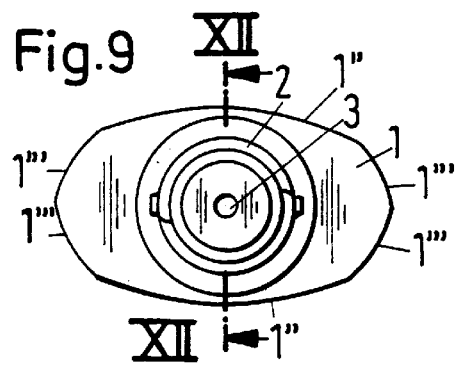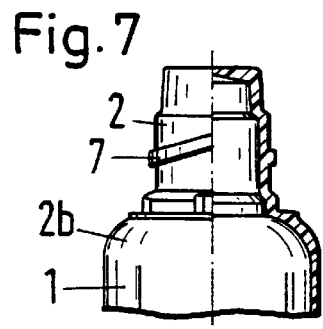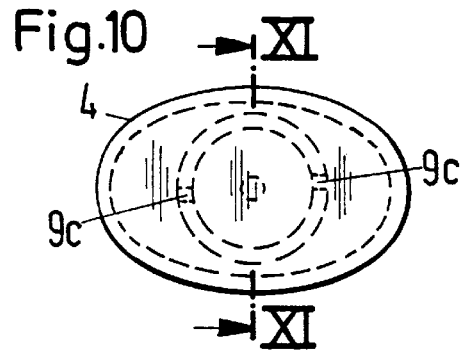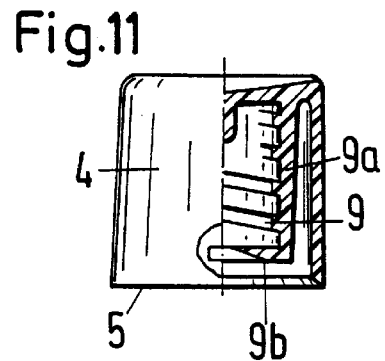

PLASTIC CLOSURE WITH CORRESPONDING TUBE BODY

BACKGROUND OF THE INVENTION

1. Field of the Invention

The present invention relates to a plastic tube with a tubular tube body which is connected through a shoulder to a neck having an external thread and with a screw cap which can be screwed with an internal thread onto the external thread of the neck.

2. Description of the Related Art

A plastic tube of the above-described type is known from DE-PS 41 00 894. In addition to the screw connection of the cap to the external thread of the neck, a perforated diaphragm at the neck and a corresponding perforated element, for example, a truncated cone, are provided at the screw cap; however, these elements are not significant with respect to the present invention. This tube has the disadvantage of being of relatively complicated construction and another disadvantage is the fact that the tube body and the neck with the external thread are manufactured in one piece and, thus, of the same plastic material.

DE-OS 41 00 757 discloses a plastic tube which has a rectangular cross-section and is manufactured by blow molding, wherein the tube body also is integrally connected to the tube neck. A closure cap to be pressed on in the longitudinal direction of the tube can be connected to the tube neck by locking. Another disadvantage is the fact that this tube must be filled from that side which later is the side for dispensing the contents of the tube. This is relatively cumbersome and time-consuming In addition, there is the danger that air bubbles remain in the interior of the tube after filling the tube.

PCT/EP 91/02164 discloses a collapsible container for pasty products which has a shape similar to a tube. The body of this container is not rectangular in cross-section in the collapsed state. Two oppositely located side walls can be folded together in the manner of a harmonica. Seen in longitudinal direction of the container, one end of the container is closed permanently while the other end has a nozzle which can be closed by a screw cap. Also in this case, the body of the container and the part with the nozzle are manufactured in a single piece.

In DE-OS 41 00 757 as well as in PCT/EP 91/02164, the oppositely located side surfaces of the tube body are completely plane and parallel to each other. Consequently, a number of such tubes can be stacked easily and safely without requiring repacking. However, the features and effects thereof explained above with respect to the prior art do not suggest the subject matter of the present invention and the advantages achieved thereby.

Also, it should be mentioned that, in the prior art tubes, it must be ensured that the screw cap sealingly contacts the externally threaded neck either when the screw cap is automatically mounted by the manufacturer or when the screw cap is mounted manually. In this connection, there is the danger that the screw cap is screwed on too much or that the screw cap separates if the screw cap was screwed on to an insufficient extent.

SUMMARY OF THE INVENTION

Therefore, it is the primary object of the present invention to improve the construction of a plastic tube of the above-described type. In particular, a high stability of the tube body and the cap is to be achieved while simultaneously using different plastic materials for the externally threaded neck and the tube body. Also, the manufacturing costs should be very low.

In accordance with the present invention, in a plastic tube as described above, the shoulder is injection molded onto the corresponding end of the tube body, wherein the shoulder and the externally threaded neck are constructed in one piece. The shoulder and the adjacent end of the tube body have a polygonal cross-section and the same polygonal cross-section continues over the length of the tube body. At least two side surfaces of the tube body extend from this transition point essentially plane or with a straight surface toward the end of the tube.

The plastic tube according to the present invention has the advantage that the configuration of the tube body in the form of a polygon is very stable against external pressure. Another advantage is the fact that the tube can be provided with a shape which is aesthetically pleasing to the observer. This aspect will be explained further hereinbelow, particularly with respect to the aesthetic total impression when the cap is screwed on. By injection molding the shoulder onto the tube body, two results are achieved with one work operation, i.e., the connection of shoulder and externally threaded neck to the tube body as well as the formation of the shoulder and the externally threaded neck in one piece with the shoulder. In contrast, in the tubes according to the above-described prior art, in which the tube body and the shoulder with the threaded neck are manufactured together from one and the same plastic material, the present invention provides the additional advantage that the tube body can be manufactured with very low costs from an extruded hose or plastic tube which has the optimum properties required of such a tube body, wherein the unit composed of the shoulder and the externally threaded neck is usually made of a material which is significantly harder than the material of the tube body. Also, plastic materials having different colors can be used for the tube body and for the cap. Also, the optimum plastic material can be used for each component. Another advantage of the plastic tube according to the present invention is the fact that it is very simple to print on the tube body. This is because the approximately plane side surfaces of the tube body make it possible that the imprint can be exactly positioned, so that simultaneously there is the advantage of a clearly printed imprint. A completely plane configuration of the side surfaces, as it is required in DE-OS 41 00 757 and in PCT/EP 91/02164, is not absolutely required in the plastic tube according to the present invention. This makes the transition from the printed side surfaces from the remaining surfaces of the tube body easier and, in addition, provides a better appearance of the tube body. Also, there is the advantage that the imprint can be carried out on the tube body before the shoulder and the threaded neck are injection molded onto the tube body; in this connection, reference is made to the method according to the present invention to be explained below. The plastic tube according to the invention further provides the advantage that due to the configuration of the tube in the form of a polygon, the screw cap can be aligned if desired in its end position when screwed onto the thread of the threaded neck exactly in accordance with the corners of the polygon. This also makes it optically clear to the user that the fully closed position of the plastic tube has been reached.

In order to ensure that, in addition to the advantages describe above, a sealing action between the externally threaded neck and the cap placed on the neck can be achieved and that the cap slides into the end position on the neck, a preferred further development of the invention provides that the shoulder widens from the base area of the externally threaded neck toward the point of connection between the end of the shoulder and the tube body in a conical shape or a convex shape, wherein the inner surface of the cone or the concave inner surface of the convex shape is directed toward the filling end of the tube body located opposite the externally threaded neck, and wherein the outer surface of the cone or the convex outer surface serves as a guide surface and support surface for the edge of the cap and for supporting the cap on the shoulder in the end position of the cap. As a result, the cap is aligned in its final position relative to the tube body; in particular, the cap is centered on the tube head. Also, after the cap has been screwed on, the cap sealingly rests against the externally threaded neck.

In accordance with a first embodiment of the invention, the externally threaded neck changes over in the base area thereof into a square or rectangular shoulder, preferably convex shoulder, and the portion of the tube having a square or rectangular cross-section is connected to the shoulder.

In accordance with another feature, the edge of the screw cap slides at the end of the screwing procedure onto the shoulder of the externally threaded neck, wherein only after overcoming a frictional force the screw cap slides into a locking and snaptype connection with the externally threaded neck. The additional advantages, such as aesthetic shape, exact positioning, precise imprint and alignment for optically indicating the closed position, have already been explained above.

In contrast to the snap and screw cap known from DE-PS 41 00 894, the screw cap of the plastic tube according to the present invention is not displaced into the locking position, but rather the screw cap is forcibly turned further into a position in which the screw cap sealingly rests against the externally threaded neck, while overcoming a frictional force occurring at the end of the screwing procedure and possibly a deformation force. This forced guidance during the screwing procedure (also called sliding-in during the screwing procedure) or during unscrewing the screw cap is due to the high torque required for overcoming the frictional force and the counter force resulting from the deformation of the elastic material of the shoulder. In addition, there is the advantage mentioned above that the aligned positions of the screw cap having a square or rectangular cross-section and the square or rectangular shoulder makes it optically clear that the screw cap is screwed on correctly.

In accordance with a second embodiment of the invention, the externally threaded neck changes in the base area thereof into an elliptical shoulder, preferably convex shoulder, and a tube body having a hexagonal cross-section is connected to the shoulder. Contrary to the first embodiment of the invention which provides for a locking and snap-type connection between the screw cap and the externally threaded neck, the frictional force to be overcome and possibly the deformation force serve for securing a sealing contact of the screw cap with the externally threaded neck. Also in this case, the forcible sliding in during the screwing procedure as described above takes place. The additional advantages which are also present in this embodiment, such as, aesthetic shape, exact positioning, precise imprint and alignment for optically indicating the closed position, have already been explained.

The flexibility of the used plastic materials and the sliding capability relative to each other can be selected in such a way that the frictional force and possibly also the deformation force are adjustable within a wide range. The occurring resistance can be easily determined by measuring instruments and can be utilized by controlling an automatic screwing procedure. The elastic plastic material ensures that the screw cap can be opened and closed as often as desired. Another advantage is that the sealing contact of the screw cap with the externally threaded neck is reliably ensured, because the same torque must be applied for opening as is required for screwing the screw cap onto the neck.

In accordance with another embodiment of the invention, the locking and snap-type connection includes a circumferential bead provided at the externally threaded neck at the transition to the shoulder, wherein two diametrically oppositely located projections are arranged on the bead which engage in diametrically oppositely located recesses of an end face of a sleeve formed in the rectangular cap. This embodiment can be easily manufactured and ensures a safe and positively engaging connection.

In accordance with a preferred feature, the sleeve formed in the cap has an internal thread which in the areas of the recesses is composed of an elastic plastic material and the projections each have a slanted surface onto which the sleeve slides with the inner surface in the area of the recesses for locking. By appropriately dimensioning the slanted surfaces, the sliding capability is improved in a simple manner, and it is ensured that the elasticity limit of the sleeve is not exceeded. The sleeve is spread apart when the inner surface of the sleeve slides onto the slanted surfaces during locking.

In accordance with another feature of the present invention, a stop surface is provided which reliably prevents overturning of the screw cap when the screw cap is screwed on. The protection against overturning can be further improved by providing that the projections rest on the shoulder.

In the second embodiment of the invention described above, the externally threaded neck changes in the base area thereof into an elliptically shaped shoulder, preferably convex shoulder, and a hexagonally shaped tube is connected to the shoulder. This provides an optically aesthetically pleasing shape of the tube body, wherein an imprint can be provided on correspondingly wide surface portions of the hexagonally shaped tube body. The same advantage is provided by the first embodiment with a tube body having a rectangular or square shape.

In accordance with another feature, the stop for reliably preventing overturning of the screw cap at the end of the screwing procedure is formed by diametrically oppositely located projections formed on the bead, wherein the projections are engaged by a wedge-shaped counterpiece provided on the sleeve.

Another feature provides that the projections on the bead are located in the principal axis of the elliptical cross-section of the shoulder. This makes it possible for the user to overcome even high frictional forces or deformation forces. Also, this ensures the aligned position of screw cap and shoulder.

In accordance with another feature which can be used in both embodiments of the invention, the internal thread of the screw cap and the external thread of the neck are dimensioned with such a length that the elastic resistance of the material of the shoulder occurring when overcoming the frictional force causes the internal thread of the screw cap and the external thread of the neck to be forcibly disengaged, so that the screw cap can be pulled off. This ensures that the plastic tube is always completely opened.

In accordance with another feature, the shoulder is bevelled toward the rim areas thereof. This provides an optically pleasing transition between the screw cap and the tube body when the plastic tube is closed.

Another feature provides that the externally threaded neck has an outlet opening for the tube contents, wherein a pin arranged at the bottom of the cap engages the outlet opening. This feature further improves the tightness of the screw connection.

In accordance with another feature, the shoulder and the end of the tube body have overlapping edge portions. This ensures that the tube body does not tear open in this transition area when high pressure loads occur.

In accordance with another feature, the tube body overlaps the externally threaded neck. This makes it possible to manufacture in a simple manner a continuous and rounded transition between the tube body and neck. In this connection, it is advantageous if the bevel of the shoulder referred to above it provided on the outer side of the shoulder.

The present invention is also directed to a method of manufacturing the plastic tube described above.

In the method according to the present invention, a tubular preform of the tube body is manufactured by extrusion from thermoplastic material. Subsequently, a marking and possibly an imprint are applied to the tube body. The tube body is then aligned in a tool by means of the marking and the tube body is deformed, for example, expanded, into the shape of a polygon. In an injection molding unit which rests against the tool or is part of the tool, an externally threaded neck and a shoulder are manufactured by injection molding, wherein simultaneously the shoulder and the tube body are welded to each other.

In a modified embodiment of the method, a tubular tube body of thermoplastic material is manufactured by extrusion with its final cross-sectional shape before the marking and possibly the imprint are applied to the tube body.

The method according to the present invention provides the advantage that the manufacture of the plastic tube is simple. A complicated injection mold is not required. In addition, a plastic tube can be manufactured which is very stable with respect to external pressure. Moreover, by injection molding the shoulder onto the tube body, it is ensured that the plastic tube does not tear open at the transition between shoulder and tube body even when extreme external pressure loads occur. By providing a marking on the tube body and since the tube body has the special shape of a polygon, it is made possible in a simple manner to provide an imprint on the tube and/or to position the tube body.

Although it is known from German G 94 09 998.7 to weld an injection syringe to the shoulder of a tube, in that case, contrary to the present invention, the shoulder and the tube body are manufactured as a single piece. In addition, the injection syringe is manufactured prior to being connected to the tube and is not formed together as it is injection molded onto the tube.

In accordance with another feature of the invention, the edge of the tube body is bent prior to injection of the plastic material. This provides a continuous transition between the bevel of the shoulder and the straight side surfaces of the tube body.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 6 is an elevational view, partly in section, of a second embodiment of the plastic tube according to the present invention;

FIG. 7 is a side view, partially in section, of the second embodiment seen in the direction of arrow VII in FIG. 6;

FIG. 8 shows, on a larger scale, a detail of the plastic tube denoted by B in FIG. 1;

FIG. 9 is a top view of the plastic tube of FIG. 6 without screw cap;

FIG. 10 is a top view of the screw cap;

FIG. 11 is a longitudinal sectional view taken along sectional line XI—XI in FIG. 10.

DESCRIPTION OF THE PREFERRED EMBODIMENTS

Figure 1:
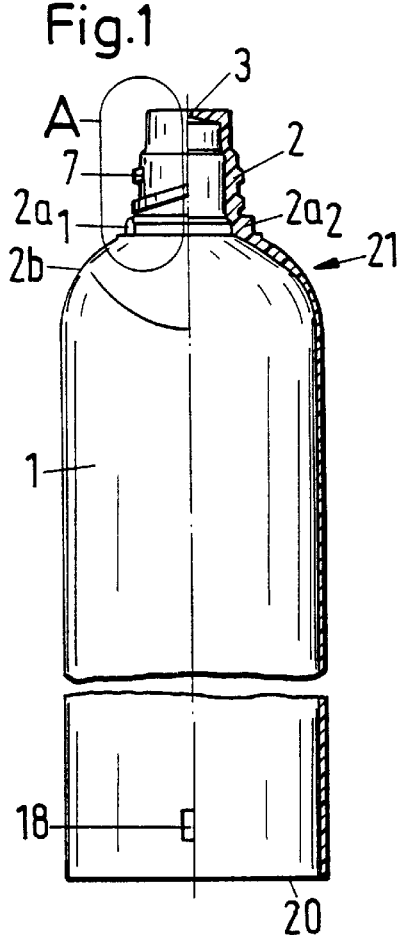
FIG. 1 is an elevational view, partly in section, of a first embodiment of the plastic tube according to the present invention.
Figure 3:
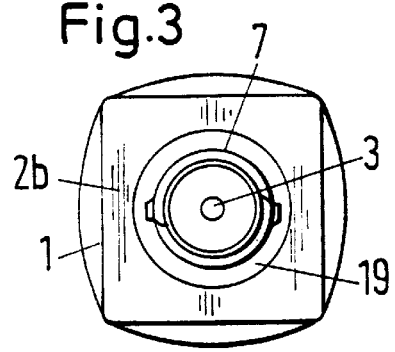
FIG. 3 is a top view of the plastic tube of FIG. 1 without screw cap.

FIG. 1 of the drawing shows a first embodiment of the plastic tube according to the present invention with a tube body 1 in the form of a square polygon. The tubular tube body 1 is connected to an externally threaded neck 2. A screw cap 4, shown in FIGS. 4 and 5, can be screwed onto the external thread 7 of the neck 2. In the area 21, i.e., the uppermost area of the end 1' of the tube body 1 as seen in the drawing, a shoulder 2b and the externally threaded neck 2 are manufactured so as to produce a permanent welded connection to the tube body 1 by means of injection molding. The details of the manufacture of the plastic tube will be described below in connection with the description of the method according to the present invention. From the connection area 21, the shoulder 2b extends upwardly conically converging toward the externally threaded neck 2. As already mentioned, the conical shape may also form a convex shape. The shoulder 2b and the externally threaded neck 2 are constructed as a single piece.

Figure 5:
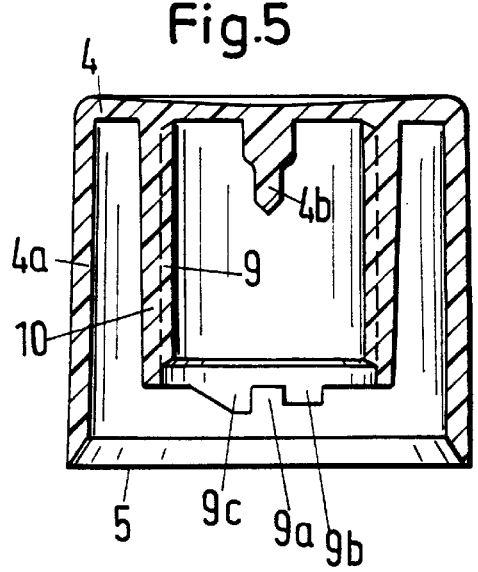
FIG. 5 is longitudinal sectional view taken along sectional line V—V of FIG. 4.

The first embodiment shown in FIG. 1 as well as a second embodiment of the invention, shown in FIG. 6 and to be explained hereinbelow, have in common that the externally threaded neck 2 is connected in its base area 2a to a shoulder 2b in such a way that the shoulder 2b and the adjacent end of the tube body 1 form a polygon. In the first embodiment of the invention, at least two side surfaces extend from the transition point approximately plane or with straight surfaces to the tube end 20. In the second embodiment of the invention, six side surfaces are provided. Both embodiments of the invention have in common that the bottom rim 5 of the screw cap 4, as seen in FIGS. 5 and 11 of the drawing, slides onto the shoulder 2b of the externally threaded neck 2 when the screw cap is screwed on. By selecting an appropriately elastic plastic material for the shoulder 2b, it is necessary at the end of the screwing procedure to overcome a frictional force which occurs when the rim 5 slides onto the shoulder 2b and possibly also a deformation force. In the first embodiment of the invention, the sealing contact of the screw cap 4 to the externally threaded neck 2 is ensured by a locking and snap-type connection 2a1, 1a2, 9a, 9b, 9c as well as by the frictional force or the deformation force which must be overcome as described above. In the second embodiment of the invention, this frictional force exclusively serves for securing the sealing contact of the screw cap 4 on the externally threaded neck 2.

In the first embodiment of the invention shown in FIGS. 1–5 of the drawing, the externally threaded neck 2 changes in the base area 2a over into a square shoulder 2b which is outwardly convex in the illustrated embodiment. Connected to the shoulder 2b is the tube body 1 which also has a square cross-section. This square area extends essentially over the entire length of the tube body.

Figure 4:
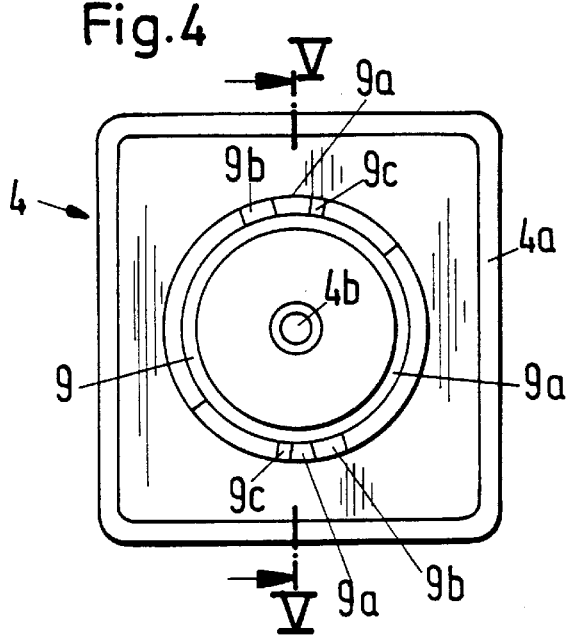
FIG. 4 is a top view of a screw cap for the plastic tube of FIG. 1.
Figure 2:
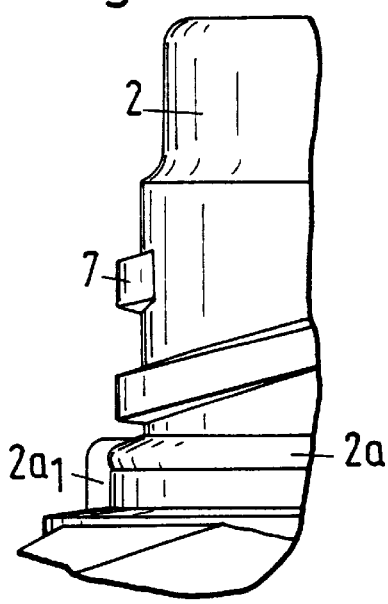
FIG. 2 shows, on a larger scale, a detail of the plastic tube denoted by A in FIG. 1.

The screw cap 4 shown in FIGS. 4 and 5 is composed of a cap 4a which has a square cross-section and a sleeve 10 with an internal thread 9 extending in longitudinal direction from the bottom of the cap 4a. The externally threaded neck 2 has at its base part, i.e., at the transition to the shoulder 2b, a circumferential bead 2a on which two diametrically oppositely located projections 2a1, 2a2 are arranged. These projections engage for producing the locking and snap-type connection in diametrically oppositely located recesses 9a arranged at the end face of the sleeve 10. In the area of the recesses 9a, the sleeve 10 or the internal thread 9 may be constructed of an elastic plastic material, wherein it is also possible within the scope of the invention that the entire sleeve or the screw cap are of an elastic plastic material. Each of the projections 2a1, 2a2 has a slanted surface, wherein the sleeve 10 slides with its internal surface in the areas of the recesses 9a onto the slanted surface for effecting the locking connection. The resulting spreading effect of the sleeve 10 must be dimensioned in such a way that the elasticity limit of the used plastic material is not exceeded.

Diametrically oppositely located projections 9b, 9c with rectangular portions 9b and saw tooth-shaped portions 9c separated by the recesses 9a are formed onto the end face of the sleeve 10. The height of the rectangular portion 9b is selected smaller than the height of the saw tooth-shaped portion 9c. As a result of these dimensions of the rectangular portion 9b and the saw tooth-shaped portion 9c, only the saw tooth-shaped portion 9c rests on the shoulder 2b when the locking and snap-type connection is effected. The connection is secured against rotation because of the effect of the elasticity of the plastic material of the shoulder and the resulting initial tension.

As shown in the drawing, particularly in FIGS. 7 and 11, the internal thread 9 of the screw cap 4 and the external thread 7 of the neck 2 may have such a length that the internal thread 9 and the thread 7 are forcibly disengaged as a result of the elastic resistance of the material of the shoulder 2b occurring when overcoming the frictional force. The screw cap 4 can then be pulled off. Preferably, a rectangular thread profile is used, wherein diameter and pitch are selected together with a conical narrowing of the externally threaded neck in such a way that the threads are disengaged from each other after a 90° or 180° rotation of the screw cap 4.

FIG. 6 shows a second embodiment of the plastic tube according to the present invention, wherein the right half is a longitudinal sectional view and the left half is an elevational view. In this embodiment, the externally threaded neck 2 changes over in its base area into a shoulder 2b which has an approximately elliptical shape as seen in the top view of FIG. 9 and an outwardly convex cross-section as seen in FIG. 7. To the shoulder 2b is connected a tube body 1 which has a hexagonal cross-section. When the screw cap 4 is screwed on, the rim 5 of the screw cap 4 slides onto the shoulder 2b of the externally threaded neck 2.

The convex shape of the shoulder mentioned in connection with the descriptions of the first and second embodiments has several advantages. First, a shoulder having this convex shape can be injection molded more easily than a completely plane shoulder. Also, the curved shape is optically pleasing. Finally, there are no edges which could occur between plane surfaces of the shoulder. In addition, the outwardly convex areas of the shoulder ensure that, when the screw cap is screwed on, the screw cap must slightly press against the elastic force of these convex shapes. The resulting tension of the convex shoulder material produces the result that in the last phase of the screwing procedure the screw cap is forced by the tension automatically into the final closing position.

It is recommended that, for carrying out the screwing procedures described above, the shoulder 2b extends from the base area of the externally threaded neck 2 with an expanding diameter in an inclined manner from the inside and top toward the outside and bottom, resulting in a conical cross-section, as seen in FIGS. 1, 6, 7 and 12. The conical surface preferably is upwardly convex. In the foregoing, the terms "top" and "bottom" refer to the positions as seen in the figures of the drawing.

As shown in detail in FIGS. 10 and 11, the screw cap 4 is composed of an oval cap 4a and a sleeve 10 with an internal thread 9 extending in longitudinal direction from the bottom of the cap 4a. The internal thread 9 has in the end portion thereof a circumferential bevel 9b. At the transition to the shoulder 2b, a circumferential bead 2a is formed on the externally threaded neck 2. The bead 2a has two diametrically oppositely located projections 2a1, 2a2. These projections 2a1, 2a2 are located in the principal axis of the elliptical cross-section of the shoulder 2b and serve as a stop for a conical counterpiece 9c of the sleeve 10 in order to limit the rotating movement. For securing against rotation, the internal thread 9 and the thread 7 have such a length that the bevel 9b slides onto the bead 2a at the end of the screwing procedure.

Figure 12:
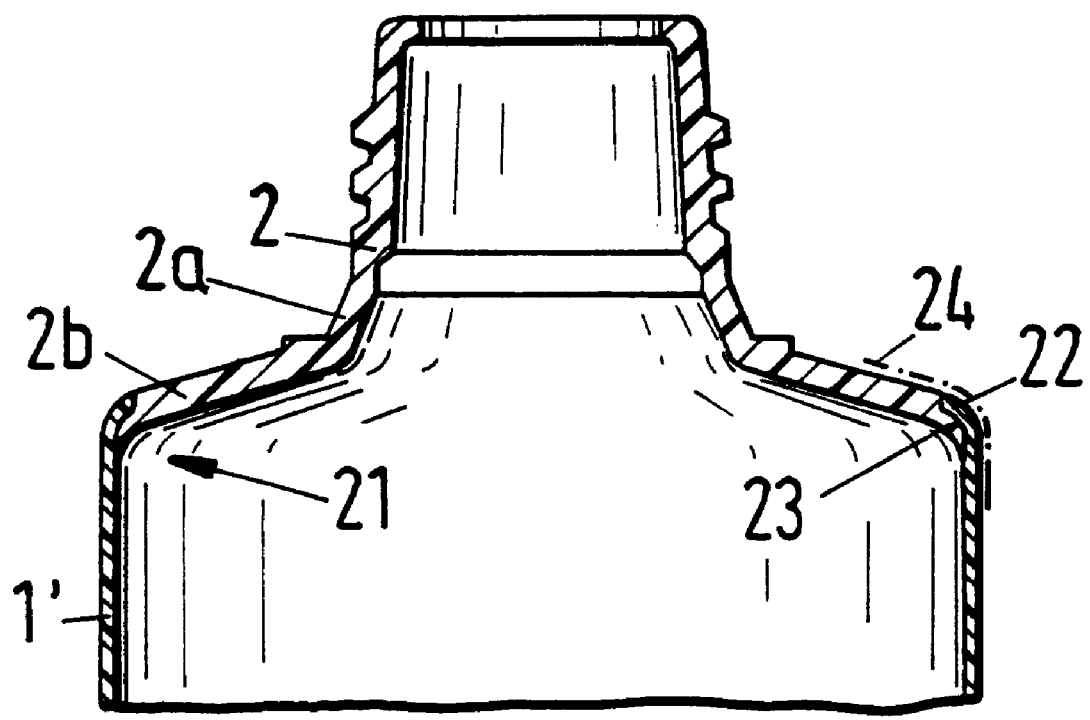
FIG. 12 is a partial sectional view, on a larger scale, taken along sectional line XII—XII of FIG. 9.

In the following, the first embodiment of the invention shown in FIGS. 1–5 in which the polygon forms a square at the transition from the shoulder to the tube body will be explained first. In a first manufacturing step, a tubular preform of the tube body is manufactured from thermoplastic material by extrusion, for example, through an annular nozzle. This preform has a round cross-section. For positively positioning the tube body during the subsequent manufacturing step, a marking 18 is applied to the tube body 1 after the extrusion. Simultaneously, an imprint or the like is imprinted onto the tube body 1. In a third manufacturing step, the tube body 1 is aligned in a tool by means of the marking 18 and is deformed in the tool into the shape of a square polygon. For example, a hollow blow mold may be provided for this purpose in which the tube body is expanded into the shape of a polygon. This deformation can also be produced by an internal tool whose outer surface has the required shape for producing the aforementioned square shape. By either using the internal tool which cooperates with the external tool, or by carrying out a separate step, a bent portion 22 of the end 1' of the tube body 1 toward the inside is produced, as can be seen in FIG. 12. However, this bending of the tube end is not a prerequisite for manufacturing the tube. Finally, in a last manufacturing step, the externally threaded neck 2 with the shoulder 2b is produced by injection molding within the tool, wherein the tool also surrounds the tube body 1, or at least its end 1' provided with the connection to the shoulder 2b. Simultaneously with injection molding the plastic material to form the externally threaded neck 2 and the shoulder 2b, the material is welded to the material of the end 1' of the tube body and forms a permanent welded connection making it one piece as a result.

For manufacturing a tube with a polygonal cross-section of the tube body and the adjacent end of the shoulder 2b in the form of a hexagon in accordance with the second embodiment of the invention shown in FIGS. 6–11, the method according to the invention can be varied as follows.

The tube body 1 is extruded in its final cross-sectional shape which is particularly shown in the top view of FIG. 9. Two longer sides 1", which can be imprinted later, are located opposite each other. Also forming part of the cross-section are two times two narrower side surfaces 1'" which form the aforementioned hexagon together with the side surfaces 1". Subsequently, one or both side surfaces 1" are imprinted, and the marking 18 is applied simultaneously. The tube body 1 is then placed in this final shape into the injection molding machine or the injection tool. In this case, it is not necessary to provide means for producing the hexagonal cross-section in the tool. The remaining manufacture and injection molding of the externally threaded neck 2 together with the shoulder 2b are carried out in the same manner as described above in connection with the manufacture of the tube body having the square cross-section.

Of course, the invention is not limited to tube bodies having the cross-sections described above. However, these cross-sections are particularly suitable with respect to their optically aesthetic configuration as well as the possibility of applying imprints.

As can be seen particularly in FIG. 12, the shoulder 2b and the end 1' of the tube body 1 overlap with their edges in the area 21, wherein preferably the edge portion of the end 1' of the tube body 1 engages from outside over the edge portion of the externally threaded neck 2. Consequently, after the injection molding and welding procedure has been carried out, this end portion of the shoulder 2b is beveled at its inner side, i.e., the shoulder 2b becomes narrower toward its end. Since, in addition, the outer surfaces of the shoulder 2b and of the tube body 1, 1' rest against the inner wall of the injection mold 24, only shown schematically in a dash-dot line, practically no sharp transition edge between the end 1' of the tube body and the shoulder 2b can be seen from the outside. Consequently, the transitions from the surfaces of the shoulder to the surfaces of the tube body are virtually without edges and cannot be seen.

The welding procedure can be carried out, for example, in accordance with the heat impulse method. Any unevenness, such as material excess, occurring during the injection procedure can be eliminated, so that a smooth surface without edges or seams is produced. The tube body 1 and the externally threaded neck 2 with the shoulder 2b are manufactured with thermoplastic material, preferably polyethylene. Because of the required mechanical strength and in view of the use value of the plastic tube, the screw cap may be hard and manufactured of polyethylene. Since the plastic tube according to the invention is preferably used for packing expensive cosmetics, the optical properties of the thermoplastic material plays an important role. It is also important that the plastic tube maintains its shape, particularly with respect to the formation of scratches in the area of the shoulder 2b. The plastic tube according to the present invention meets these high requirements in a simple manner.

While specific embodiments of the invention have been shown and described in detail to illustrate the inventive principles, it will be understood that the invention may be embodied otherwise without departing from such principles.

We claim:

1. A plastic tube comprising a tubular tube body having first and second ends, a neck having an external thread and a shoulder connecting the neck to the first end of the tube body, and a screw cap having an internal thread configured to be screwed onto the external thread of the neck, wherein the shoulder is a component injection molded onto the first end of the tube body, and wherein the shoulder and the neck are constructed in one piece, the shoulder and the first end of the tube body having a substantially polygonal cross-section, wherein the polygonal cross-section of the tube body extends from the first end of the tube body in the direction to the second end of the tube body, wherein the neck has a base area, the shoulder extending from the base area of the neck toward a transition point between the shoulder and the tube body in a conical shape or a convex shape, wherein an inner surface of the conical shape or a concave inner surface of the convex shape is directed toward the second end of the tube body, and wherein an outer surface of the conical shape or a convex outer surface constitute a guide surface and support surface for an edge of the cap and for supporting the cap on the shoulder in an end position of the cap in which the cap is fully screwed onto the neck, wherein the shoulder is rectangular or square, and a square or rectangular portion of the tube body is connected to the shoulder, wherein the shoulder of the neck is constructed such that the edge of the screw cap slides on the shoulder when the screw cap is screwed onto the neck, wherein the shoulder is of an elastic, flexible plastic material, so that a locking and snap-type connection between the screw cap and the neck is achieved only at an end of the screwing procedure after overcoming a frictional force, whereby a sealing contact of the screw cap with the neck is ensured in the end position, and wherein the screw cap comprises a top wall with a square or rectangular shape and a sleeve extending in a longitudinal direction from a bottom of the screw cap, the internal thread being formed in the sleeve, wherein the neck has at a transition point to the shoulder a circumferential bead, two diametrically oppositely located projections being mounted on the bead, the sleeve having an end face with diametrically oppositely located recesses, wherein the projections engage in the recesses for effecting the locking and snap-type connection.

2. The plastic tube according to claim 1, wherein the internal thread is in the area of the recesses of an elastic plastic material, and wherein the projections each have a slanted surface, wherein the sleeve slides with an inner surface in the area of the recesses onto the slanted surfaces for unlocking.

3. The plastic tube according to claim 1, wherein the shoulder is beveled toward a rim area thereof.

4. The plastic tube according to claim 1, wherein the neck comprises an outlet opening for contents of the tube, and the cap comprises a pin capable of engaging in the outlet opening.

5. The plastic tube according to claim 1, wherein the shoulder is convex.

6. The plastic tube according to claim 1, wherein the end face of the sleeve has diametrically oppositely located projections each comprising a rectangular part and a saw tooth-shaped part, wherein the recesses separate the rectangular part and the saw tooth-shaped part.

7. The plastic tube according to claim 6, wherein the rectangular part has a smaller height than the saw tooth-shaped part, so that the saw tooth-shaped part rests on the shoulder when the locking and snap-type connection is effected.

8. The plastic tube according to claim 1, wherein the shoulder and the first end of the tube body overlap each other.

9. The plastic tube according to claim 8, wherein the first end of the tube body engages over the shoulder from the outside.

10. The plastic tube according to claim 1, wherein the neck changes over in a base area thereof into an elliptically, preferably convex shoulder, wherein the tube body connected to the shoulder has a hexagonal cross-section.

11. The plastic tube according to claim 10, wherein the shoulder of the neck is constructed such that the edge of the screw cap slides on the shoulder when the screw cap is screwed onto the neck, wherein the shoulder is of an elastic, flexible plastic material, so that a sealing contact between the screw cap and the neck is achieved only at the end of the screwing procedure after overcoming a frictional force, whereby the overcoming of the frictional force serves to secure the sealing contact of the screw cap with the neck.

12. The plastic tube according to claim 11, wherein the screw cap comprises an oval cap and a sleeve extending from a bottom of the cap in longitudinal direction, the sleeve having the internal thread, wherein the internal thread has at an end face of the sleeve a circumferential bevel, wherein the neck has at a transition to the shoulder a circumferential bead, so that the bevel slides onto the bead in the end position.

13. The plastic tube according to claim 12, wherein the sleeve has in circumferential direction a conically shaped counterpiece, and wherein two diametrically oppositely located projections are mounted on the bead, wherein the projections serve as a stop for an edge of the counterpiece.

14. The plastic tube according to claim 13, wherein the projections are located in a principal axis of the elliptical cross-section of the shoulder.

* * * * *